United States Patent [19]
Vacon et al.

[11] Patent Number: 4,876,742
[45] Date of Patent: Oct. 24, 1989

[54] APPARATUS AND METHOD FOR PROVIDING A WIRELESS LINK BETWEEN TWO LOCAL AREA NETWORK SYSTEMS

[76] Inventors: Gary Vacon, 52 Mill St., Woburn, Mass. 01801; James J. Liu, 34 Wadsworth Rd., Sudbury, Mass. 01776

[21] Appl. No.: 29,214

[22] Filed: Mar. 23, 1987

[51] Int. Cl.⁴ .............................................. H04B 7/00
[52] U.S. Cl. .......................................... 455/66; 455/39
[58] Field of Search ..................... 455/73, 31, 32, 7, 9, 455/14, 20, 66, 39, 88; 370/85, 89, 75, 97, 60, 94; 340/825.5, 539

[56] References Cited

U.S. PATENT DOCUMENTS

| | | | |
|---|---|---|---|
| 4,016,493 | 4/1977 | Gross | 455/73 |
| 4,231,114 | 10/1980 | Dalikian | 455/57 |
| 4,491,966 | 1/1985 | Morcerf et al. | 455/73 |
| 4,500,990 | 2/1985 | Akashi | 340/825.5 |
| 4,564,838 | 1/1986 | Boulogne et al. | 370/85 |
| 4,581,736 | 4/1986 | Dobyns et al. | 370/97 |
| 4,593,281 | 6/1986 | Lare | 370/85 |
| 4,597,078 | 6/1986 | Kempf | 370/85 |
| 4,602,364 | 7/1986 | Herman et al. | 370/85 |

OTHER PUBLICATIONS

M/A—Com Mac Inc., "Private Communications with Microwave Based Local Area Networks", Bulletin 9236E.

Primary Examiner—Robert L. Griffin
Assistant Examiner—Curtis Kuntz
Attorney, Agent, or Firm—William W. Holloway

[57] ABSTRACT

In a data processing system network, apparatus and method are disclosed for coupling two local area networks by means of a wireless link. Typically, two local area network (LAN) systems are coupled by a bridge device, the bridge device receiving signal groups from each LAN system and selectively forwarding the signal groups to the target LAN system. In the presence of the overlapping (or simultaneous) transmission of signal groups applied to the target LAN system, these signal groups must be reapplied to the target LAN system until a non-overlapping transmission is obtained. In the present invention, when the LAN systems are coupled by a wireless (radiation) link, an interface unit is coupled between each wireless transmitter/detector unit and the associated LAN system. Each interface unit includes a bridge device that provides the system response to the overlapping signal groups.

8 Claims, 2 Drawing Sheets

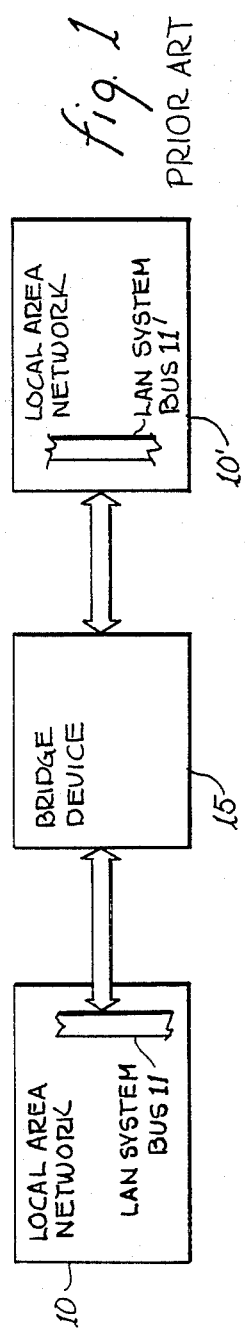
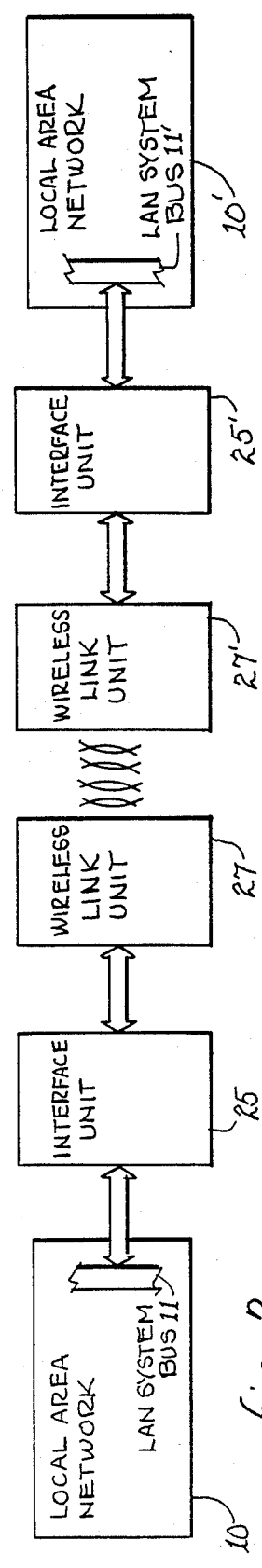
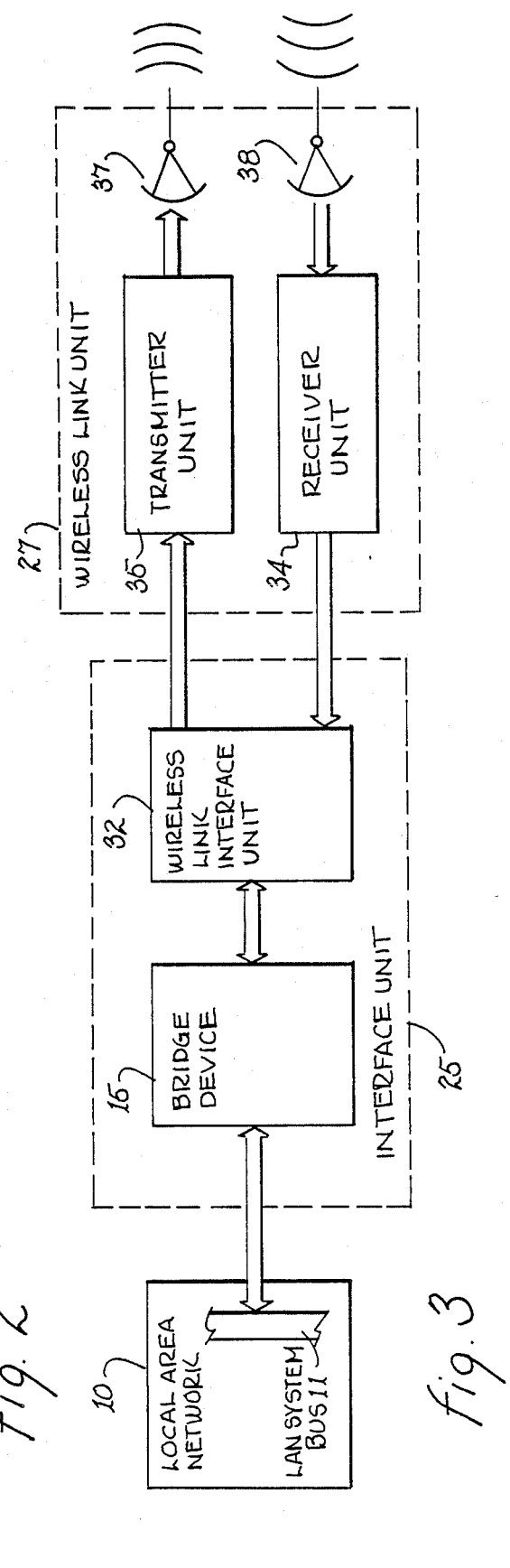

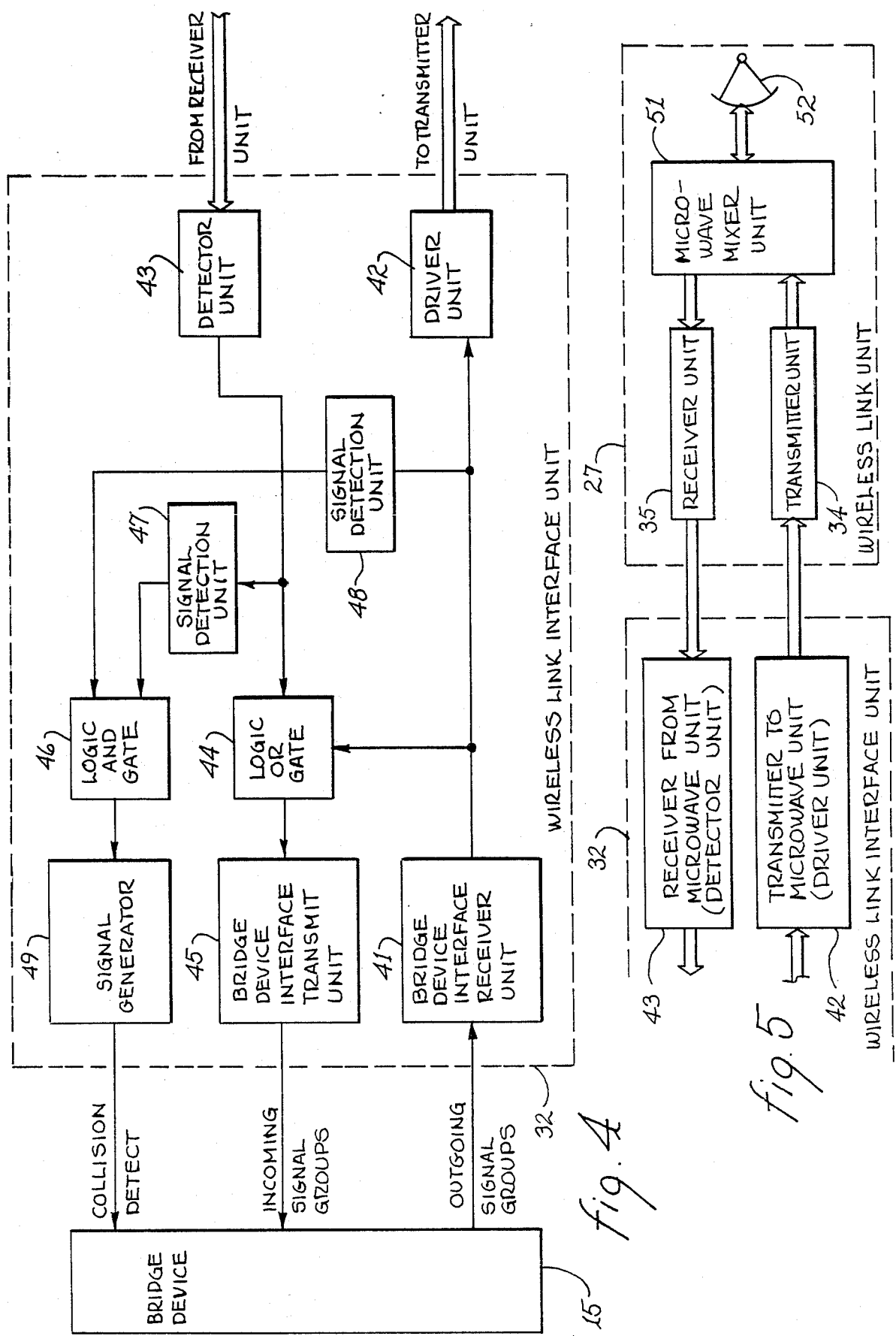

APPARATUS AND METHOD FOR PROVIDING A WIRELESS LINK BETWEEN TWO LOCAL AREA NETWORK SYSTEMS

BACKGROUND OF THE INVENTION

1. Field of the Invention

This invention relates generally to networks of data processing systems and, more particularly, to the coupling of local area network (LAN) systems. In the present invention, the coupling of the two LAN systems includes a wireless link.

2. Description of the Related Art

When a local area network system is envisioned, one of the first problems that must be addressed is the avoidance of data integrity compromise resulting from simultaneous or overlapping application of signal groups to the system communication channel by a plurality of the system components. Several techniques have been developed to address the problem of overlapping signal groups in the communication channel. According to a first technique, a system component is selected to apply signals to the communication channel while the other components assume the role of signal group receivers, Techniques such a "token rings" provide a flexible procedure for designating a (signal group) transmitting component and thereby avoiding the problem of overlapping signal groups in the communication channel (i.e., applied to the system bus). Other strict protocol techniques, such as "round-robin" protocol can designate the current system component permitted to apply signal groups to the system bus. Another technique for avoiding overlapping signal groups on a local area network system bus is to multiplex the system bus in the time domain and assign a time "slot" to each system component. Because the communications emanating from each system component can only occur at predetermined times, overlapping signal groups are avoided. A third technique permits the system components to apply signal groups to the communication channel in a generally random fashion subject to the restriction that the signal groups are not to be applied to the communication channel when the communication channel is busy. As will be clear, in this technique overlapping signal groups can be applied to the (apparently available) communication channel at substantially the same time, resulting in overlapping signal groups (i.e., a collision) and, consequently, in a compromise of signal group integrity. In this technique, the presence of overlapping signal groups, generally referred to as signal group 'collisions', is detected and the signal groups are reapplied to the communication channel until the transfer is successful (i.e., the signal transfer integrity has not been compromised by overlapping signal groups). This technique of LAN system implementation is generally referred to as a CSMA/CD (Carrier Sense Multiple Access/Collision Detect) system. The ETHERNET system of Digital Equipment Corporation is implemented in this fashion.

In order to increase the usefulness of LAN systems, techniques have been developed to couple two LAN systems together. Referring to FIG. 1, the general configuration of such a coupling is illustrated. A first local area network 10 includes a LAN system bus 11 over which information is transferred by data processing or communication systems coupled to the system bus 11. Similarly, local area network 10' includes a system bus 11' over which information is transferred by data processing system or communication systems coupled to the system bus 11'. A bridge device 15 is coupled to system bus 11 and to system bus 11'. The function of the bridge device 15 is to identify those signal groups that on the system bus of a first LAN system that are intended for distribution on the system bus of the second LAN system and to transfer those signal groups to the second LAN system bus. For the selected transmitting component technique or the time domain multiplexing technique, the bridge device 15 can be implemented as another system component, a system component synchronized with the two coupled LAN systems. The bridge 15 device for CSMA/CD type LAN system is somewhat more complicated because, for example, a signal group thought to be successfully transmitted by a component of the first LAN system can encounter a collision in the second LAN system. Therefore, in the bridge devices provided for CSMA/CD LAN networks, separate transmission apparatus is provided for transmitting signal groups in either direction. In addition, temporary signal storage apparatus is provided for both sets of transmission apparatus to store signal groups successfully transmitted from a first LAN system, but encountering a collision in the second LAN system. The storage apparatus permits the signal group, compromised by a collision in the second LAN system, to be reapplied to the second LAN system from the bridge device 15 rather than from the originating component in the first LAN system.

A pair of LAN systems can be so positioned that it is impractical to provide a physical communication channel, such as a bus, to couple the systems. If a bridge network that included a wireless link were available, then the communication between the LAN systems can be implemented. For bridge networks that couple non-CSMA/CD LAN systems, the presence of the wireless link can be accommodated by extension of the collision avoidance techniques used by the LAN systems. However, in coupling the CSMA/CD LAN systems the problem of the overlapping signal groups is more severe because of the lack of a physically available channel of communication, especially for the detection of a collison between signal groups.

A need has therefore been felt for a technique of coupling two CSMA/CD LAN systems by a bridge network that includes a wireless link, the bridge network being capable of identifying and responding to simultaneous exchange of information signals over the wireless link.

FEATURES OF THE INVENTION

It is an object of the present invention to provide an improved technique for coupling a plurality of data processing units.

It is a feature of the present invention to couple two local area networks by a wireless (i.e., radiation) link.

It is a more particular feature of the present invention to couple two local area networks, using the Carrier Sense Multiple Access/Collision Detect (CSMA/CD) implementation, by a wireless (i.e., radiation) link.

It is another particular feature of the present invention to provide a wireless link between two ETHERNET systems using as many commercially available components as possible.

SUMMARY OF THE INVENTION

The aforementioned and other feature are accomplished, according to the present invention, by providing a pair of radiation transmitter/receiver units for the exchange of modulated radiation signals over a wireless link. Coupled between each transmitter/receiver unit and an associated LAN system is an interface unit. The interface unit includes apparatus for identifying the presence of signal groups being simultaneously transmitted in both directions over the wireless link. Both bridge units can identify the simultaneous transmission of data and can notify the coupled LAN systems in a manner insuring transmission of uncompromised data.

These and other features of the present invention will be understood upon reading of the following description along with the drawings.

BRIEF DESCRIPTION OF THE DRAWINGS

FIG. 1 is a block diagram of the coupling of local area networks according to the prior art.

FIG. 2 is a block diagram of a apparatus coupling two CSMA/CD local area networks by a wireless communication channel according to the present invention.

FIG. 3 is a block diagram illustrating additional components of the apparatus linking two data processing system networks FIG. 4 is a block diagram of the components of the interface unit according to the present invention.

FIG. 5 is a block diagram of the present invention when the wireless link is implemented by a microwave link.

DETAILED DESCRIPTION OF THE PREFERRED EMBODIMENT

1. Detailed Description of the Figures

FIG. 1 has been previously discussed with reference to the related art.

Referring next to FIG. 2, the component block diagram of the coupling of a first CSMA/DC local area network having a LAN system bus 11 and with a second CSMA/CD local area network having a LAN system bus 11' is shown. Interface network 25 exchanges signals with the LAN system bus 11 and with the wireless link unit 27. Similarly, interface unit 25' exchanges signals with the LAN system bus 11' and with the wireless link unit 27'. The wireless link units 27 and 27' transmit signal groups to and receive signal groups from the other wireless link unit.

Referring next to FIG. 3, major components of the interface unit 25 and the wireless link unit 27 are shown. With respect to the interface unit 25, the bridge device 15 exchanges signal groups with the LAN system bus 11. The bridge device 15 is the same bridge device 15 shown in FIG. 1 for coupling two CSMA/CD LAN systems. The bridge device 15 also exchanges signal groups with wireless link interface unit 32 which couples the interface unit 25 to the wireless link unit 27. The transmitter unit 33 of the wireless link unit 27 receives signal groups from the wireless link interface unit 32 and applies signal groups to the antenna/transmitter element 37. The receiver unit 34 of wireless link unit 27 receives signals from antenna/receiver element 38 and applies signal groups to the wireless link interface unit 32.

Referring next to FIG. 4, a component block diagram of the wireless link interface unit 32 is shown. The detector unit 43 converts the signal groups from the receiver unit 34 of wireless link unit 27 (of FIG. 3) into a format compatible with the LAN system signal groups and applies the resulting signals to logic OR gate 44 and to signal detection unit 47. The bridge device interface receiver unit 41 receives outgoing signal groups from the bridge device 15 and applies signals to logic OR gate 44, signal detection unit 48 and driver unit 42. The driver unit 42 reformats the signal groups into signals that are applied, in a suitable format, to transmitter unit 35 of wireless link unit 27. The output signals of logic OR gate 44 are applied to bridge device interface transmit unit 45 and the output signals from bridge device interface transmit unit 45 are applied to bridge device 15 as incoming signal groups. The output signals from the signal detection unit 47 and the signal detection unit 48 and applied to logic AND gat 46, a positive output signal from logic AND gate 46 activating signal generator unit 49. The output signal from the signal generator unit 49 is applied to the bridge device 15 as collision detect signals. (When the present invention is implemented in an ETHERNET environment, the signal generator 49 is typically a 10 MHz oscillator activated by a signal from logic AND gate 46). The logic OR gate 44 provides a path by which the transmitted signal groups can be monitored by the transmitting system.

Referring next to FIG. 5, the implementation of the wireless link unit 27 by means of a microwave link is shown. The microwave technology permits a single antenna 52 to receive and to transmit the microwave signals. A microwave mixer unit 51 exchanges signals with antenna 52, receives signals from transmitter unit 51 and applies signals to receiver unit 34. Detector unit 43, in the preferred embodiment, is implemented as receiver unit for signals from the microwave (wireless) link unit 27 having a 1 volt peak-to-peak value from a 75 ohm source modulated in the Manchester code format. The driver unit 43 provides a 1 volt peak-to-peak signal to a 75 ohm impedance modulated in the Manchester code format.

2. Operation of the Preferred Embodiment

In the preferred embodiment of the present invention, the LAN systems are implemented using a Carrier Sense Multiple Access/Collision Detect CSMA/CD technique. In this implementation technique, the collisions (overlapping) of signal groups are accommodated rather than avoided as with the other LAN system implementation techniques. With the presence of a wireless link in coupling two CSMA/CD LAN systems, this accommodation becomes more difficult due to the lack of communication across the link. Thus, the problem of accommodation of a collision involving a signal group already transmitted must be addressed.

In the present invention, this problem is addressed by providing two bridge devices 15 that normally couple two CSMA/CD networks. These devices act in the usual manner with respect to the coupled LAN systems. With respect to signal groups that are transmitted over the wireless link, additional apparatus is provided to detect the presence of a signal group collision occurring over the wireless link. Both bridge devices receive signals indicating that a signal group being transmitted over the wireless link has been involved in a collision. As a result, the bridge device can retain a copy of the uncompromised signal group and can retransmit the signal group over the wireless link when a collision has been detected.

The situation is further complicated by the implementation technique whereby the signal groups are arranged in packets, the packets having a minimum time period or duration. Because the collision must be detected by both interface units 25 and 25' (i.e., acitvation of the by signal generator 49 of both interface units) and because of the potential duration of the packet being the minimum value, the distance between the antennas in the wireless link must be arranged so that a packet detected by signal detection unit 48 could be transmitted to the target wireless link unit and returned to the transmitting link unit in time so that signal detection unit 48 along with signal detection unit 47 could activate signal generator 49. When the wireless link unit in used in conjunction when ETHERNET systems and the wireless link is implemented in microwave technology, the maximum distance between microwave antennas is approximately 4 miles.

Although the implementation of the wireless link has been described in terms of a microwave link, the present invention can be applied to optical links, infrared links, laser links etc. with the proper implementation of the interface units.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for exchanging signal groups between two local area networks, wherein said signal groups are exchanged through a wireless medium, said apparatus comprising:

a first and a second transmitter/receiver unit for transmitting and detecting radiation propagated across said wireless medium, said first and said second transmitter/receiver units exchanging signal groups therebetween;

a first and a second local area network each including a local bus and local processing components coupled to said local bus, said local processing components applying signals to and receiving signals from said local bus;

a first bridge circuit coupled to said first transmitter/receiver unit and to a first local bus of said first local area network for transferring signal groups therebetween, said first bridge circuit identifying first signal groups on said first local bus to be applied to a processing component of said second local area network and applying said first signal groups to said first transmitter/receiver unit for transmission to said second transmitter/receiver unit; and a second bridge circuit coupled to said second transmitter/receiver unit and a second local bus of said second local area network for transferring signal groups therebetween, said second bridge identifying second signal groups on said second local bus to be applied to a processing component in said first local area network and applying said second signal groups to said second transmitter/receiver unit for transmission to said first transmitter/receiver unit, wherein said first and said second bridge circuits include apparatus for identifying simultaneous transfer of a first signal group and a second signal group therethrough, an identification of a simultaneous transfer causing a reapplication of said first signal group participating in said simultaneous transfer to said first transmitter/receiver unit and a reapplication of said second signal group participating in said simultaneous transfer to said second transmitter/receiver unit.

2. The apparatus for exchanging signal groups between two local area networks of claim 1 wherein said bridge circuits are circuits used for directly coupling two local area networks.

3. The apparatus for exchanging signal groups between two local area networks of claim 1 wherein each of said local area networks are implemented using Carrier Sense Multiple Access/Collision Detect techniques.

4. The apparatus exchanging signal groups between two local area networks of claim 3 wherein each of said local area networks use the ETHERNET protocols.

5. The apparatus for exchanging signal groups between two local area networks of claim 4 wherein said first and second bridge circuits are implemented with bridge circuits used to couple directly two ETHERNET local area network systems.

6. The apparatus for exchanging signal groups between two local area networks of claim 5 wherein transmission of radiation across said wireless link is implemented using microwave techniques.

7. The apparatus for exchanging signal groups between two local area networks of claim 6 wherein said wireless link has maximum distance between transmitter/receiver units determined by a minimum period for a signal group.

8. The apparatus for exchanging signal groups between two local area networks of claim 1 wherein said apparatus for identifying simultaneous transfer has:

a first signal detection unit producing a first signal during transmission of a first signal group, a second signal detection unit producing a second signal during reception of a second signal group, and a signal generator applying a collision signal to an associated bridge circuit in response to said first and said second signal.

* * * * *